July 31, 1956

W. L. EXNER 2,757,282

MULTIVIBRATOR CIRCUITS

Filed Dec. 20, 1952

2 Sheets-Sheet 1

INVENTOR.
WILLIAM L. EXNER,
BY
Seymour M. Rosenberg
ATTORNEY

MULTIVIBRATOR CIRCUITS

Filed Dec. 20, 1952

2 Sheets-Sheet 2

INVENTOR.
WILLIAM L. EXNER,
BY Seymour M. Rosenberg
ATTORNEY.

United States Patent Office 2,757,282

Patented July 31, 1956

2,757,282

MULTIVIBRATOR CIRCUITS

William L. Exner, Santa Monica, Calif., assignor, by mesne assignments, to Hughes Aircraft Company, a corporation of Delaware Application December 20, 1952, Serial No. 327,134

1 Claim. (Cl. 250—27)

This invention relates to multivibrator circuits and more particularly to multivibrator circuits for generating a delayed electrical output signal, the delay interval provided by the circuit being extremely accurate and being variable within a range from the order of milliseconds to the order of minutes.

It is well known in the electronics art that an electrical output signal from either a single-shot or a free-running multivibrator may be utilized to provide a desired delay interval. In several prior art multivibrator circuits, the output signal is of squarewave configuration and swings from one voltage level to another voltage level at the start of the delay interval and returns to the original voltage level at the end of the delay interval. Still other multivibrator circuits of the prior art are responsive to an applied triggering pulse for presenting an electrical output pulse at a predetermined time after the application of the triggering pulse.

In each of these prior art multivibrator circuits, the time delay provided is a function of the discharge transient of one or more timing capacitors, each timing capacitor interconnecting the grid of an associated electron discharge device with the plate of another electron discharge device. The discharge path of each capacitor includes a timing resistor which is connected either to the cathode of the associated electron discharge device or to the high or anode voltage supply.

In the first instance, if the timing resistor connected to the cathode is of the order of two megohms, delay intervals up to several thousand microseconds may be obtained with timing capacitors of reasonable size. However, this arrangement has the disadvantage that the discharge transient of the capacitor approaches the cutoff voltage for its associated electron tube at a relatively small angle of incidence. Accordingly, the delay interval is susceptible to relatively large variations in response to relatively minute variations in the circuit parameters and applied voltages.

If, on the other hand, the timing resistor is connected to the anode voltage supply, the angle at which the discharge transient of the timing capacitor crosses the cutoff value of the associated electron tube is relatively large, and more precise delay intervals may, therefore, be obtained. However, the delay intervals obtainable with this arrangement are usually considerably smaller than those obtainable with similar components in a circuit wherein the timing resistor is connected to the cathode. In addition, the capacitor discharge transient is still exponential in form, thereby reducing to a considerable extent the timing accuracy of the circuit.

The maximum delay intervals obtainable with any of the prior art multivibrator circuits set forth above is limited by many practical considerations such as the reliability, size, cost and weight of the electric components utilized in the timing circuits of the multivibrators. For example, the timing resistor utilized should not exceed several megohms in value since resistors of higher value are inherently unreliable and are susceptible to resistance variations over a relatively large range. Similarly, if it is desired to utilize a variable resistor for providing a variable delay interval, the maximum resistance of the variable resistor is limited to several megohms since variable resistors of higher value are unobtainable. Assume, however, that it is desired to increase the delay interval by utilizing a larger timing capacitor, such as an electrolytic capacitor, for example. The prior art circuits are then limited by the inherent instability and leakage currents of electrolytic capacitors. In a similar manner, the factors of cost, reliability, weight and physical size effectively prevent the utilization of nonelectrolytic capacitors, having correspondingly high capacitances, in the timing circuits of these prior art multivibrators.

The present invention, on the other hand, provides multivibrator circuits, having at least one astable state, for producing relatively precise delay intervals within the range from a fraction of one second to as high as one minute or more. According to the basic concept of this invention, the discharge path of the timing capacitor includes a variable impedance compensating network which produces a relatively linear discharge transient for the timing capacitor and which provides time constants which are in practice unobtainable with conventional multivibrator circuits.

In its most basic form, the variable impedance compensating networks utilized in the multivibrator circuits of this invention include a combination of electrical circuit elements interconnecting one end of the associated timing capacitor with the anode supply potential to provide a very high impedance discharge path for the associated timing capacitor. In addition, the impedance of the network varies as the timing capacitor discharges in order to provide a linear discharge transient, or in other words, to compensate for the normal tendency of the capacitor to discharge exponentially.

More particularly, the variable impedance compensating networks include an electron discharge device such as a vacuum tube triode, for example, having its anode connected to the anode potential source and its cathode coupled through a high impedance resistor to one end of the associated timing capacitors. In addition, the control grid of the tube is connected to the timing capacitor in order to provide a circuit for biasing the tube as a function of the capacitor discharge current, thereby compensating for the tendency of the discharge current to decrease by increasing the transconductance of the tube.

According to one embodiment of the invention, a cathode-coupled single-shot multivibrator, having one stable state and one astable state, is provided for generating a squarewave output pulse having a time duration of the order of seconds in response to the application of an electrical triggering signal. According to another embodiment of the invention, there is provided a plate-coupled free-running or astable multivibrator which has a period of the order of seconds and a relatively precise mark-space ratio.

It is, therefore, an object of this invention to provide multivibrator circuits for generating a delayed electrical output signal, the delay interval provided thereby being relatively precise and being variable within the range from the order of milliseconds to the order of minutes.

Another object of this invention is to provide multivibrator circuits which produce squarewave electrical output pulses having time durations of the order of seconds or higher.

It is also an object of this invention to provide single-shot multivibrator circuits in which the time duration of astable operation is of the order of seconds.

A further object of this invention is to provide multivibrator circuits in which the periods of conduction of each section thereof may be varied to exceed one second in length.

Still another object of this invention is to provide multivibrator circuits in which the discharge path of the timing capacitors includes a variable impedance compensating network for providing a relatively linear discharge transient.

It is a further object of this invention to provide a multivibrator circuit wherein at least one timing capacitor is coupled to a relatively high potential source by a variable impedance compensating network to provide a relatively linear capacitor discharge transient having a time constant of the order of seconds.

It is still another object of this invention to provide a single-shot cathode-coupled multivibrator in which the discharge path of the timing capacitor includes a variable impedance compensating network for providing a linear capacitor discharge transient.

The novel features which are believed to be characteristic of the invention, both as to its organization and method of operation, together with further objects and advantages thereof, will be better understood from the following description considered in connection with the accompanying drawings in which several embodiments of the invention are illustrated by way of examples. It is to be expressly understood, however, that the drawings are for the purpose of illustration and description only, and are not intended as a definition of the limits of the invention.

Figure 1:
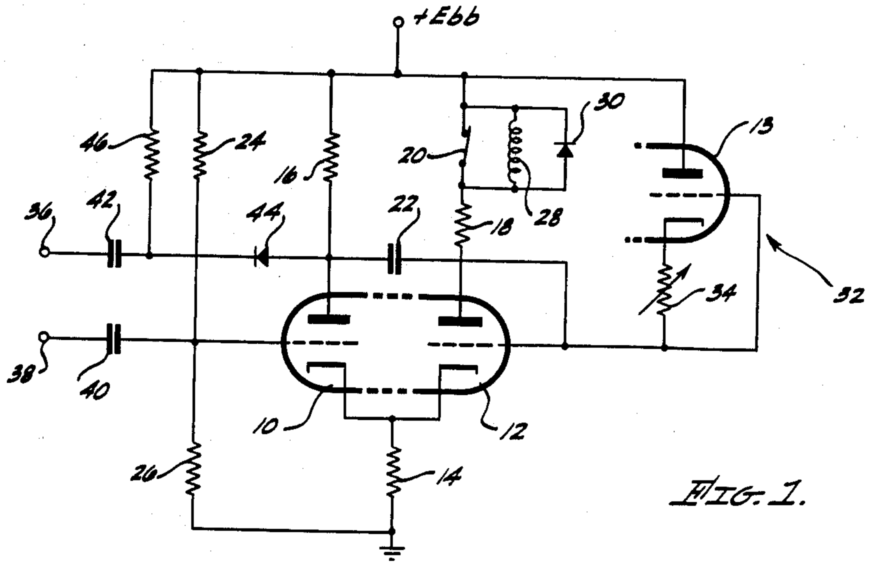
Fig. 1 is a schematic diagram of a single-shot cathode-coupled multivibrator, according to the present invention.

Referring now to the drawings, there is shown in Fig. 1 a stabilized multivibrator delay circuit, according to this invention, for providing a squarewave electrical output signal including a squarewave pulse of relatively long and precise predetermined time duration. The stabilized multivibrator circuit shown in Fig. 1 is a single-shot cathode-coupled multivibrator including a pair of electron discharge devices, such as vacuum tube triodes 10 and 12, each having an anode, a cathode and a control grid.

The cathodes of triodes 10 and 12 are coupled to ground by a common cathode resistor 14. The anodes of triodes 10 and 12, on the other hand, are coupled to one terminal +E*bb* of a source of positive potential, not shown, by an anode resistor 16 and by a series circuit including an anode resistor 18 and a normally closed switch 20, respectively. The potential source also includes another terminal, not shown, which is grounded.

The anode of triode 10 is also coupled to the grid of triode 12 by a timing capacitor 22, while the grid of triode 10 is connected to the common junction of two resistors 24 and 26 which serially interconnect terminal +E*bb* and ground and coact as a voltage divider. In addition, an inductor 28 and a unidirectional current device, such as a crystal diode 30, are connected in parallel across switch 20.

The grid of triode 12 is also coupled to terminal +E*bb* through a variable impedance compensating network, generally designated 32, which provides the exceptional electrical stability inherent to the multivibrator circuits of this invention. Variable impedance compensating network 32 includes an electron discharge device, such as a vacuum tube triode 13, having an anode, a cathode and a control grid. The cathode of triode 13 is coupled to its own control grid and to the grid of triode 12 by an impedance element, such as variable resistor 34, while the anode of triode 13 is connected directly to terminal +E*bb*.

As will be more clearly understood from the description below, the multivibrator circuit shown in Fig. 1 may be triggered by a negative pulse applied at one input terminal 36 or by a positive pulse applied at a second input terminal 38. Input terminal 38 is coupled to the grid of triode 10 through a capacitor 40, while input terminal 36 is connected to the anode of triode 10 by a unidirectional current path including a capacitor 42 and a unidirectional current device, such as a crystal diode 44, the anode of diode 44 being connected to the anode of triode 10. In addition, the common junction of capacitor 42 and diode 44 is connected to terminal +E*bb* through a resistor 46.

The operation of the circuit shown in Fig. 1 will be described with reference to Fig. 2 which is a composite diagram of the waveforms of electrical signals appearing at various points in the circuit to Fig. 1. It will be assumed that prior to time $t_0$ in Fig. 2, the multivibrator circuit is in its quiescent operating state with triode 12 conducting and triode 10 biased below cutoff by the potential applied to its grid from the voltage divider combination of resistors 24 and 26. It will also be recognized that in the quiescent state triode 12 functions essentially as a cathode follower.

Figure 2:
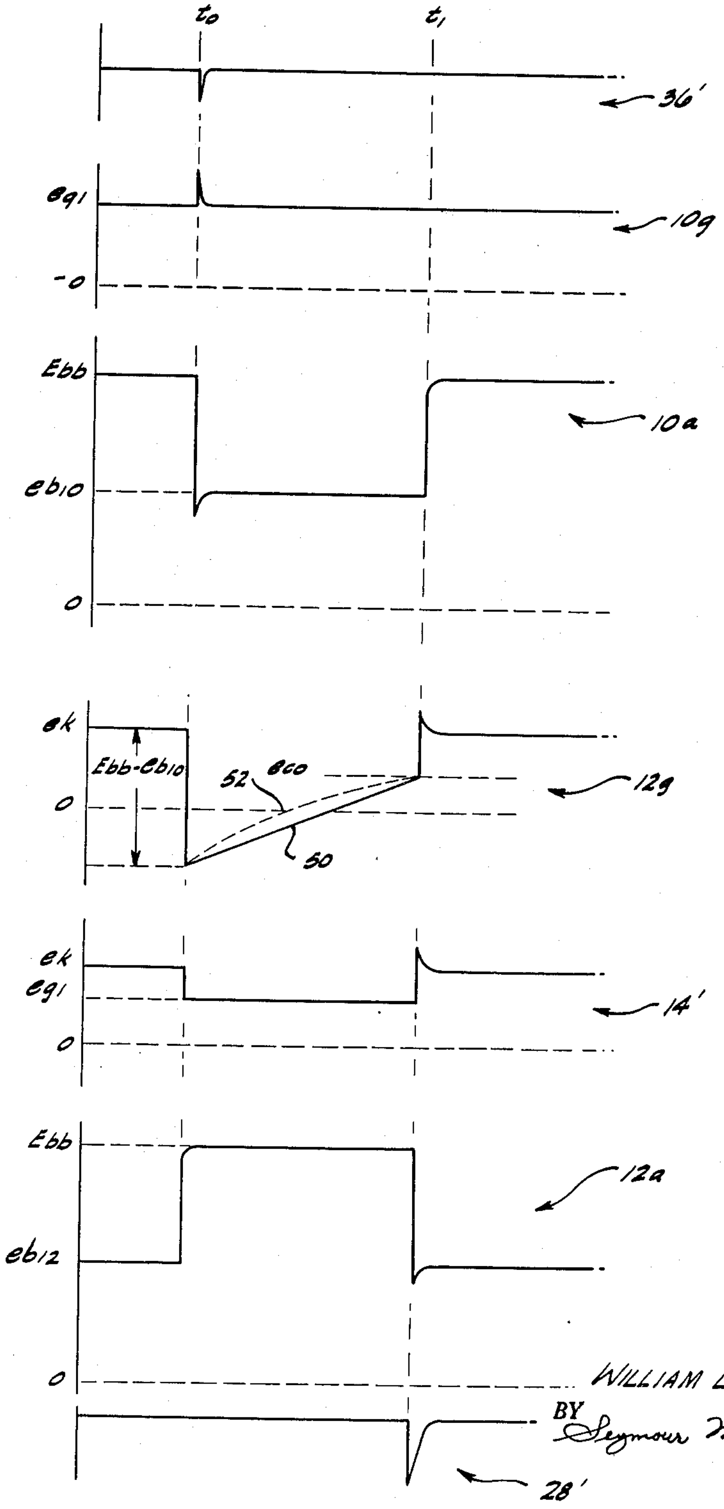
Fig. 2 is a composite diagram of the waveforms of electrical signals appearing at various points in the circuit of Fig. 1.

Accordingly, prior to time $t_0$, the signal, generally designated 12*g* in Fig. 2, which appears on the grid of triode 12 will have substantially the same magnitude as the signal, generally designated 14' in Fig. 2, which appears across common cathode resistor 14. The magnitude of these signals prior to time $t_0$ is shown in Fig. 2 by the potential $e_K$. It must follow, therefore, that since this potential is applied to the cathode of triode 10, the values of resistors 24 and 26 should be selected to normally maintain the grid of triode 10 sufficiently below potential $e_K$ to bias triode 10 below cutoff in its quiescent state.

In operation, the cathode-couple multivibrator circuit of this invention may be triggered by applying a negative electrical pulse signal, generally designated 36' in Fig. 2, at input terminal 36 or by the application of a positive electrical pulse signal at input terminal 38. The waveform of the positive pulse signal corresponds to that of the signal, generally designated 10*g* in Fig. 2, which appears at the grid of triode 10, although it is clear, of course, that the signal applied to input terminal 38 may not have a direct-current voltage level corresponding to that of signal 10*g*. It will also be recognized that although structure is shown for triggering the circuit of Fig. 1 in either of two manners, in practice the circuit would preferably include structure for triggering the circuit in one manner only.

The switching action which occurs upon the application of either a positive or a negative trigger pulse is substantially the same, and is described in detail on pages 2–53 to 2–55 of the book entitled "Principles of Radar," by the M. I. T. Radar School Staff, published in 1946 by the McGraw Hill Book Company of New York. Briefly stated, the application of a positive pulse at input terminal 38 drives the grid of triode 10 in the positive direction, and initiates a regenerative switching action whch drives triode 12 below cutoff and renders triode 10 conducting. On the other hand, a negative electrical pulse applied at input terminal 36 drives the grid of triode 12 in a negative direction and initiates the same regenerative switching action.

It will be recognized by those skilled in the art that the switching action of the multivibrator transpires within an extremely short time interval and for practical purposes may be considered to be essentially instantaneous, as shown in Fig. 2 by the various waveforms at time $t_0$. The signals appearing at the anode of triode 10 and the grid of triode 12 are shown in Fig. 2 by the waveforms generally designated 10*a* and 12*g*, respectively.

When triode 10 is driven to its conducting state, the signal, generally designated 10*a* in Fig. 2, which appears at its anode, drops in potential from its high level value of substantially +E*bb* to its low level value $e_{b10}$. Accordingly, the magnitude of signal 12*g* is lowered a corresponding amount by timing capacitor 22, thereby driving the grid of triode 12 far below its cutoff potential.

The time duration through which triode 12 remains cutoff and triode 10 conducts is, of course, determined by the discharge transient of capacitor 22 which controls the potential at the grid of triode 12. When this potential has risen to the cutoff value for triode 12, the circuit again switches back to its quiescent state and triode 10 is cut-off and triode 12 conducts.

In the conventional prior art single-shot cathode coupled multivibrators, the discharge path of the timing capacitor usually includes a timing resistor of the order of two megohms which in conjunction with the capacitance of the particular timing capacitor utilized, controls the slope and time constant of the capacitor discharge transient. In these prior art circuits, the discharge transient must be exponential. In addition, the maximum time constant obtainable is limited by practical limitations as to the physical size and electrical values of the timing capacitor and timing resistor.

Referring again to Fig. 1, it will be recognized that the discharge path for timing capacitor 22 includes variable impedance compensating network 32 in series with the parallel combination of resistor 16 and the impedance to ground through triode 10 and common cathode resistor 14. It may be shown mathematically that the discharge current which flows through this circuit when capacitor 22 starts to discharge is substantially equal to $$i=\frac{E}{\mu R_{34}}\epsilon^{-\frac{t}{\mu R_{34}C}} \qquad (1)$$

where $i$=current through capacitor 22;
$E$=potential across capacitor 22;
$R_{34}$=resistance of resistor 34;
$C$=capacitance of capacitor 22; and
$\mu$=amplification factor of triode 13.

Assume now that triode 13 has a $\mu$ of the order of 100, and that variable resistor 34 is set at a value of two megohms. It is clear, therefore, that the impedance to the flow of current through capacitor 22, neglecting leakage currents, is substantially equal to $2\times100=200$ megohms. Accordingly, the time constant of the discharge transient is equal to $(2\times10^8C)$. It will be recognized by those skilled in the art that time constants as long as 20 seconds and more may be obtained by merely utilizing conventional timing capacitors having relatively small values of capacitance.

The description set forth above illustrates how exceptionally long capacitor discharge timing transients are obtained in the multivibrator circuit shown in Fig. 1. It may be recalled, in addition, that the discharge transient of capacitor 22 is also relatively linear in contradistinction to the exponential discharge transients of conventional multivibrator circuits. The linearity of the discharge transient of capacitor 22 may be best explained by considering the behavior of variable impedance compensating network 32 during the discharge interval.

If it is assumed that resistor 34 is adjusted to one specific value, it is clear that at the instant capacitor 22 starts to discharge, the current therethrough, neglecting leakage currents, may be determined from Equation 1. It is also apparent that if the discharge transient is to follow Equation 1, the amplification factor $\mu$ of triode 13 must remain constant. However, as capacitor 22 discharges, the voltage thereacross decreases, thereby tending to decrease the discharge current. As this current tends to decrease, the voltage drop across resistor 34 also tends to decrease, thereby tending to lower the potential between the grid and cathode of triode 13. Accordingly, triode 13 will attempt to conduct more heavily, thereby compensating for the tendency of the discharge current to decrease. It will be recognized, therefore, that triode 13 and resistor 34 coact as a variable impedance network to effectively provide an extremely high impedance constant-current generator.

Referring again to Fig. 2, it will be noted that the portion 50 of signal 12*g*, occurring between times $t_0$ and $t_1$ rises in a relatively linear manner until the grid of triode 12 is driven to its cutoff potential at time $t_1$. If it is assumed that conventional resistors and capacitors alone could be utilized in the multivibrator circuit for providing a similar delay interval, the discharge transient of the timing circuit would be substantially as shown by the dotted line 52 in Fig. 2. Assuming that the cutoff potential for triode 12 when it is in its conducting state is shown by the potential $e_{CO}$ in Fig. 2, it is immediately apparent that curve 52 approaches the potential $e_{CO}$ at an angle of incidence which is considerably less than that of portion 50 of signal 12*g*. Since the effect of variations in circuit parameters during operation is to shift the relative position of the discharge transient with respect to the cutoff potential of triode 12, it is clear that variation in a circuit parameter for the circuit shown in Fig. 1 will produce a smaller change in the time interval between times $t_0$ and $t_1$ than a similar circuit variation will produce in a conventional multivibrator circuit utilizing only a timing resistor and capacitor.

At the instant $t_1$ triode 12 again starts to conduct, thereby increasing the potential across common cathode resistor 14 which, in turn, decreases the current through triode 10. The potential at the anode of diode 10 thus increases, raising the potential at the grid of triode 12 due to the coupling action of capacitor 12. It is apparent, therefore, that a second regenerative switching action takes place almost instantaneously, and that the cathode follower circuit returns to its quiescent operating state with triode 12 conducting and triode 10 cutoff.

The time interval between times $t_0$ and $t_1$, or in other words, the period through which triode 12 is cut off may be varied at will by merely varying the setting of resistor 34. The following list sets forth typical electrical values which may be assigned to the various electrical components in the circuit of Fig. 1. When components having these values are utilized, delay intervals between one fourth of a second and 20 seconds are easily obtainable. In addition, the timing accuracy of the circuit has been found to be insensitive to variations in the supply voltage of plus-or-minus 50% when these components are utilized.

| | |
|---|---|
| Triodes **10** and **12** | 12AU7 |
| Triode **13** | ½12AX7 |
| Resistor **34** | 2 Meg. |
| Resistor **14** | 5K |
| Resistor **16** | 39K |
| Resistor **18** | 10K |
| Resistor **24** | 82K |
| Resistor **26** | 12K |
| Resistor **46** | 100K |
| Capacitor **22** | .5μf. |
| Capacitor **40** | 1000μμf. |
| Capacitor **42** | 1000μμf. |
| E*bb* | 175 volts |

It will be noted that in the multivibrator circuit shown in Fig. 1, one end of cathode resistor 14 is grounded and that the potential at the cathodes of diodes 10 and 12 is always above ground potential. It should be pointed out, therefore, that if it is desired to minimize the effect of cathode-to-heater leakage currents within triode 10 and 12 a negative reference potential may be applied to resistor 14 instead of ground and the potential at terminal +E*bb* may be lowered by the magnitude of the negative potential.

In practice either signal 10*a* or the signal, generally designated 12*a* in Fig. 2, which appears at the anode of triode 12, may be utilized as an electrical output signal for actuating associated electronic equipment. As will be described below, however, the multivibrator circuit shown in Fig. 1 may also be utilized for providing a negative electrical pulse output signal at the end of its delay interval or, in other words, at time $t_1$.

In the description thus far presented, it has been assumed that switch 20 has been in its normally closed position shunting inductor 28 and damping diode 30. Assume now, however, that switch 20 is operated, thereby removing the shunt from inductor 28. Under these conditions, current conducted by triode 12 will obviously flow through inductor 28, and damping diode 30 will be back biased. When the circuit is triggered at time $t_0$ and triode 12 is driven below cutoff, damping diode 30 provides a low impedance shunt across inductor 28, thereby damping out the current which would otherwise tend to "ring" therethrough. However, when triode 12 is again rendered conductive at time $t_1$, diode 30 is again back biased, and inductor 28 instantaneously tends to inhibit the passage of current through triode 12. Accordingly, the signal generally designated 28' in Fig. 2, which appears at the junction of resistor 18 and inductor 28, includes a sharp negative pulse at time $t_1$. It has been found that if the inductance of inductor 28 is of the order of 10 millihenries and the values tabulated above are assigned to the remainder of the circuit components, negative pulses having a magnitude of the order of 40 volts may be produced in signal 28'.

It is to be understood, of course, that the variable impedance compensating network which is utilized in the one-shot cathode-coupled multivibrator circuit of Fig. 1 may also be utilized in other types of multivibrator circuits such as free-running plate-coupled multivibrators, for example.

Figure 3:
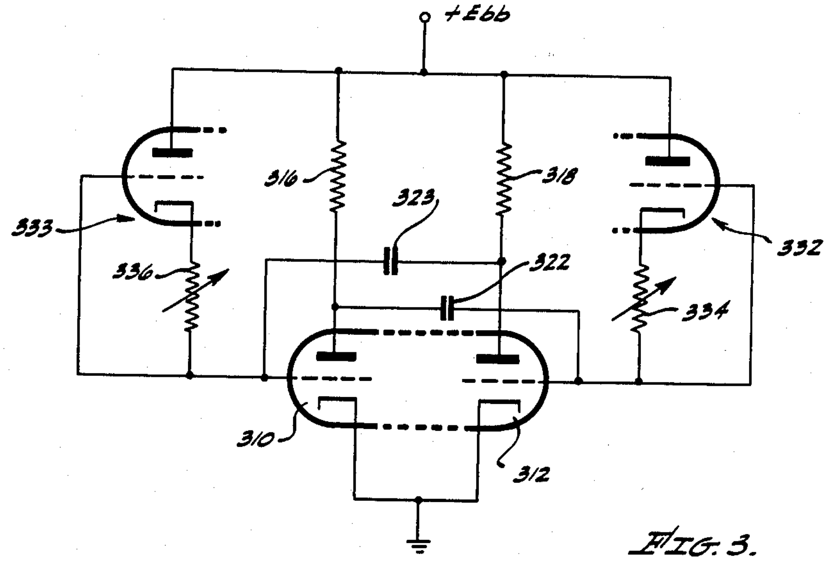
Fig. 3 is a schematic diagram of a free-running plate-coupled multivibrator circuit, according to this invention.

Referring now to Fig. 3 there is shown a free-running plate-coupled multivibrator circuit which includes two electron discharge devices, such as vacuum tube triodes 310 and 312, for example, each having an anode, a cathode and a control grid. The cathodes of triodes 310 and 312 are each connected directly to ground while their anodes are connected to one terminal +E*bb* of a source of anode potential, not shown, through two anode resistors 316 and 318, respectively. In addition, the anode of triode 310 is coupled to the grid of triode 312 by a timing capacitor 322 while the anode of 312 is coupled to the grid of triode 310 by a timing capacitor 323.

The multivibrator circuit of Fig. 3 also includes two variable impedance compensating networks generally designated 332 and 333, for intercoupling the grids of triodes 312 and 310, respectively, with the source of anode potential. The structure of each of the variable impedance compensating networks is identical with that shown and described in Fig. 1 and includes an electron discharge device, such as a vacuum tube triode having an anode, a cathode and a grid. The anode of each triode is connected to terminal +E*bb*, while the cathodes and grids are interconnected by resistors 334 and 336, respectively.

Assume now that variable resistors 334 and 336 are preset at some predetermined values and that the multivibrator circuit is rendered operative. It will be recognized, of course, that the multivibrator circuit will switch from one conducting state to the other conducting state in the conventional manner known to the art. In other words, triode 310 will conduct while triode 312 is cut off for a first predetermined interval after which triode 312 will conduct while triode 310 is cut off for a second predetermined interval. Due to the exceptionally high impedance presented by variable impedance compensating networks 332 and 333 to the discharge of timing capacitors 322 and 323, respectively, it will be recognized that the constant of the discharge transient for each of these capacitors will be extremely large. In addition, as set forth previously in connection with Fig. 1, the impedance of each variable impedance compensating network varies as its associated capacitor discharges, thereby effectively providing a linear discharge transient for its associated capacitor. Accordingly, it may be seen that the multivibrator circuit shown in Fig. 3 may be utilized for providing mark periods and space periods of relatively long duration of the order of seconds, and in addition, provide relatively precise and constant mark-space ratios.

It is obvious, of course, that although the circuit shown in Fig. 3 utilizes two variable impedance compensating networks, free-running multivibrator circuits according to the present invention may be provided in which only one variable impedance compensating network is utilized. For example, if it is desired to have triode 310 conduct for a relatively short interval of the order of several hundred microseconds and to have triode 312 conduct for a relatively long interval of the order of several seconds, it is clear that a conventional timing resistor may be utilized in place of variable impedance compensating device 332 to cut off triode 312 for the relatively short interval desired.

It should also be understood, of course, that the foregoing disclosure relates to only preferred embodiments of the invention. For example, the triode vacuum tubes in the variable impedance compensating networks utilized in the present invention may be replaced by other electron discharge devices such as multigrid vacuum tubes. Accordingly, it should be clear that numerous modifications or alterations may be made in the multivibrator circuits of the present invention without departing from the spirit and scope of the invention as set forth in the appended claim.

What is claimed as new is:

A single-shot multivibrator circuit for generating a delayed electrical output pulse in response to the application of an electrical triggering pulse, said circuit comprising: first and second electron discharge devices each having an anode, a cathode and a control grid; a power supply source having a positive terminal and a negative terminal, for applying direct current energy to said devices; a first load resistor connected between said positive terminal and the anode of said first device; a second load resistor coupled between said positive terminal and the anode of said second device; a cathode resistor having one end connected to the cathodes of both of said devices, and the other end connected to said negative terminal; biasing means for maintaining said first device normally nonconducting, whereby said second device is normally conducting; input circuit means for applying the electrical triggering pulse to said first device for rendering said first device conducting, whereby said second device becomes non-conducting; a timing capacitor connected between the anode of said first device and the grid of said second device for controlling the period of nonconduction of said second device; a variable impedance discharge path for said capacitor, said discharge path including an adjustable resistor having one end connected to the grid of said second device, and a high-gain triode having a plate connected to said positive terminal, a grid connected to the grid of said second device, and a cathode connected to the other end of said adjustable resistor; and output circuit means including an inductor connected between said positive terminal and said second load resistor, and a unidirectional current conducting device connected in parallel with said inductor and polarized to pass current into said positive terminal.

References Cited in the file of this patent

UNITED STATES PATENTS

| | | |
|---|---|---|
| 1,934,322 | Osbon | Nov. 7, 1933 |
| 2,405,237 | Ruhlig | Aug. 6, 1946 |
| 2,502,687 | Weiner | Apr. 4, 1950 |
| 2,577,074 | Dickinson | Dec. 4, 1951 |
| 2,589,240 | Frye | Mar. 18, 1952 |